United States Patent [19]

Banka et al.

[11] Patent Number: 4,885,650
[45] Date of Patent: Dec. 5, 1989

[54] MAGNETIC HEAD HAVING BORON CARBIDE SURFACES

[75] Inventors: Eugene F. Banka, Livonia; Charles B. Hebeler, Farmington, both of Mich.

[73] Assignee: Unisys Corporation, Detroit, Mich.

[21] Appl. No.: 185,603

[22] Filed: Apr. 25, 1988

[51] Int. Cl.[4] .............................................. G11B 5/255
[52] U.S. Cl. ..................................... 360/122; 360/129
[58] Field of Search ............... 360/122, 119, 125, 126, 360/127, 129, 130.2, 130.21; 29/603

[56] References Cited

U.S. PATENT DOCUMENTS

| | | | |
|---|---|---|---|
| 3,936,884 | 2/1976 | Hogan | 360/129 |
| 4,251,297 | 2/1981 | Kawabata et al. | 29/603 |
| 4,291,352 | 9/1981 | Chase | 360/122 |
| 4,356,524 | 10/1982 | Watanabe | 360/122 |
| 4,425,594 | 1/1984 | Kodjabashev et al. | 360/122 |

Primary Examiner—John H. Wolff
Assistant Examiner—Matthew J. Bussan
Attorney, Agent, or Firm—Thomas W. Baumgarten, Jr.

[57] ABSTRACT

A magnetic head for reading or writing information magnetically encoded on a substrate is disclosed. Included in the head are a magnetic core and a boron carbide contact surface which the substrate rubs against during reading or writing. The boron carbide contact surface is electrically conductive and is resistent to wear. Grounding of the conductive boron carbide contact surface avoids static electric charge build up on the contact surface caused by rubbing of the substrate against the magnetic head.

3 Claims, 2 Drawing Sheets

MAGNETIC HEAD HAVING BORON CARBIDE SURFACES

1. Field of the Invention

The invention relates to magnetic heads used for reading and writing magnetically encoded information.

2. Description of the Prior Art

Banking institutions have long used magnetic ink character recognition (MICR) devices in sorting bank checks. Such devices pass bank checks by magnetic heads which read routing and other information encoded on the checks with MICR ink. During this reading operation, the bank checks rub against the surfaces of the magnetic heads causing considerable wear to the head surfaces.

To eliminate the problem of excessive head wear, ceramic contact surfaces having a relatively high Rockwell hardness rating were placed on magnetic heads in prior art check sorting machines. These contact surfaces comprised thin pads of ceramic material which were bonded to the magnetic heads in the areas of the heads which contacted passing bank checks.

While the ceramic contact surfaces were effective in eliminating head wear, they also introduced intermittent read errors resulting from static electric charge build up on the nonconductive, ceramic material. This problem had not previously been encountered with heads having copper or brass contact surfaces connected to system ground.

In an attempt to solve the static charge problem, grounded metal strips were used to periodically contact the ceramic surfaces after each check passed by the head, thereby providing a path for static charge to periodically migrate away from the ceramic surfaces to system ground. This solution was not completely effective, since the periodic charge migration from the ceramic contact surfaces to the metal strips produced a random magnetic field which lead to magnetic head read errors.

An object of the present invention is to provide a contact surface for magnetic heads having an abrasion resistance comparable to ceramics, but which does not permit static charge build up on the contact surface.

SUMMARY OF THE INVENTION

The present invention resides in a magnetic head for reading or writing information magnetically encoded on a substrate. Included in the head are a magnetic core and an electrically conductive boron carbide contact surface which the substrate rubs against as it moves past the magnetic head during reading or writing. Electrical grounding of the conductive boron carbide contact surface avoids static charge build up caused by rubbing of the substrate against the contact surface.

A thin pad of boron carbide is used for the contact surface. The pad is attached to the magnetic core by bonding the pad to the core with electrically nonconductive epoxy.

An electrically conductive housing is used to cover the magnetic core. This housing is connected to ground and electrically isolated from the magnetic core. Grounding of the conductive contact surface is achieved by connecting the conductive contact surface to the conductive housing with an electrically conductive epoxy.

DESCRIPTION OF THE PREFERRED EMBODIMENT

Figure 1:
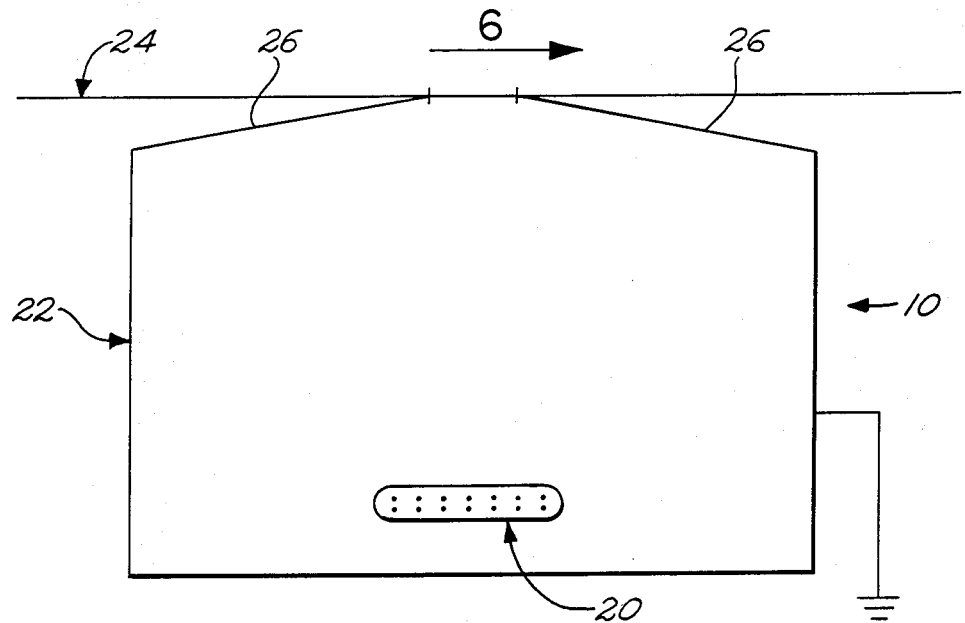
FIG. 1 is a plan view of the magnetic head with a magnetically encoded substrate in contact with the head.
Figure 3:
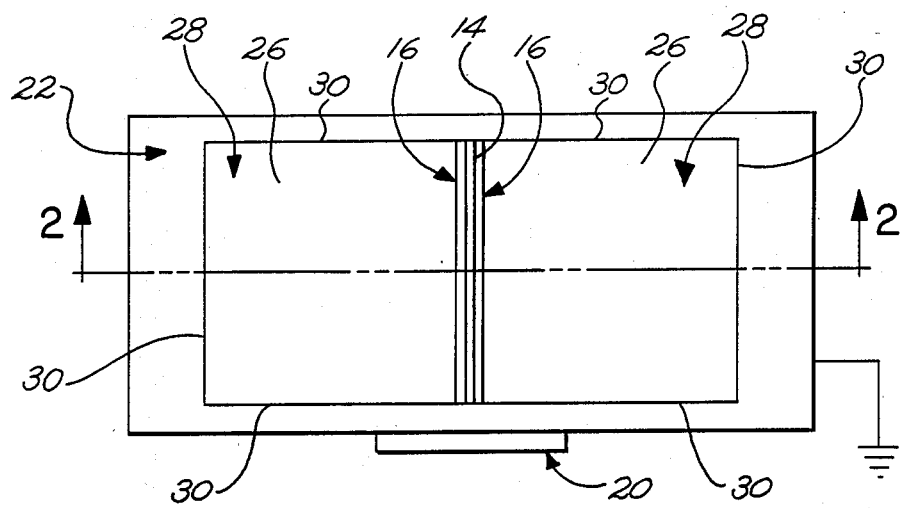
FIG. 3 is a plan view of the magnetic head looking down on the contact surfaces.
Figure 2:
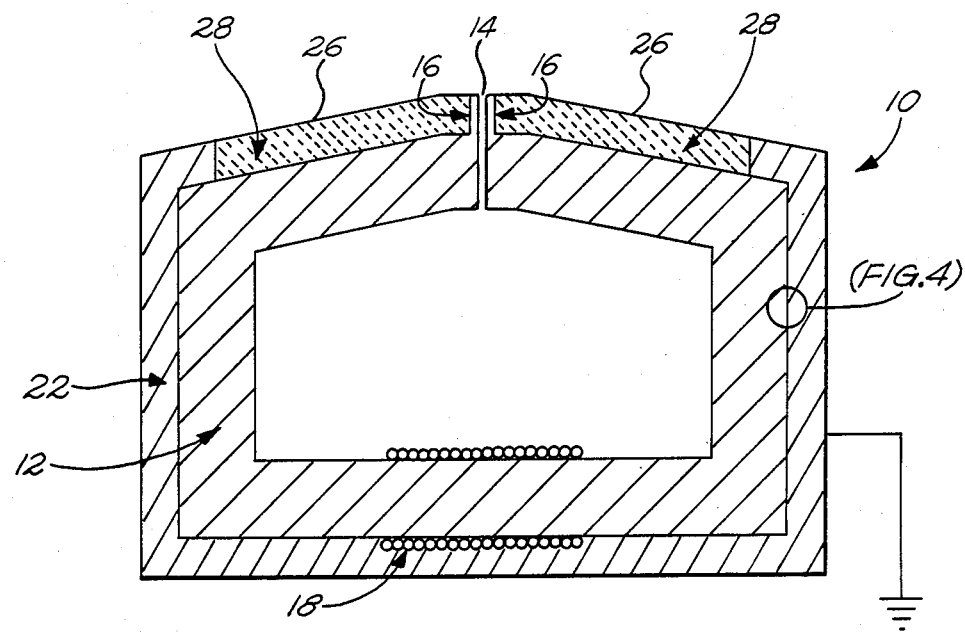
FIG. 2 is a cross sectional view of the magnetic head taken along line 2—2 of FIG. 3.

Referring to FIGS. 1 and 2, the magnetic head of the present invention is shown generally at 10. Included in the magnetic head 10 are a magnetic core 12 having nonmagnetic gap 14 and pole tips 16, a wire coil 18 wrapped around the magnetic core 12 with coil leads 20, and a conductive housing 22. These components may be made from various materials in configurations well known in the prior art. For example, the magnetic core 12 could be a multichannel iron core and the conductive housing 22 could be made from brass.

When using the magnetic head 10 for reading or writing magnetically encoded information, a substrate 24 is passed by the head 10 in the direction indicated by arrow 6. As the substrate 24 passes by the magnetic head 10, the substrate 24 will rub against the magnetic head 10 along contact surfaces 26.

Boron carbide pads 28 are bonded to the magnetic core 12, in order to provide a wear resistant material at the contact surfaces 26 for the substrate 24 to rub against. In practice, the boron carbide pads 28 are ninety-nine percent (99%) pure boron carbide approximately 0.008 inches thick, and are as long and wide as is necessary to cover the magnetic head 10 in the area contacted by the moving substrate 24.

The Rockwell hardness rating of the boron carbide pads 28 on the "C" scale is between Rc60 and Rc68. In comparison, ceramic materials used for contact surfaces in prior art magnetic heads had a Rockwell "C" scale rating of approximately Rc50. It can thus be seen that the wear resistance of the boron carbide pads 28 of the present invention actually exceeds that of the prior art ceramic contact pads.

Static electric charge build up on contact surface 26 induced by rubbing the substrate 24 against the contact surface 26 is eliminated by using an electrically conductive contact surface 26 which is electrically grounded. In the present invention, boron carbide provides an electrically conductive material for contact surface 26. The contact surface 26 is grounded by connecting boron carbide pads 28 to the conductive housing 22 which is connected to system ground. Electrical connection of the conductive boron carbide pads 28 to the conductive housing 22 is achieved by filling the space 30 between the boron carbide pads 28 and the conductive housing 22 with an electrically conductive epoxy.

In so grounding the conductive contact surfaces 26, a path is established for continuous bleed off of any static electric charge which may be deposited by the moving substrate 24 on the contact surfaces 26. This eliminates magnetic head read errors caused by build up of static electric charge on contact surfaces 26.

Figure 4:
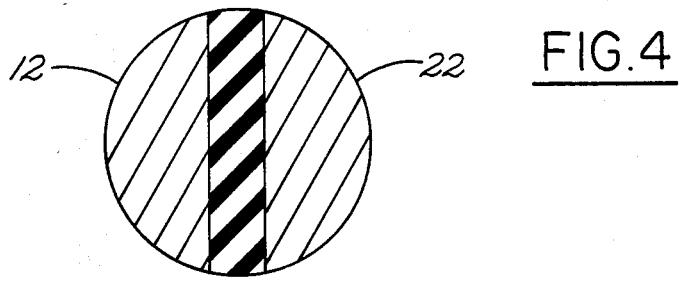
FIG. 4 is an upscale or magnified view of the encircled region between the housing and core of FIG. 2.

FIG. 4 shows in an upscale or magnified view of the encircled region between the conductive housing 22 and the core 12. The core 12 and housing 22 are electrically isolated by the spacing between the core 112 and the housing 22, which gap may be filled with non-conductive potting epoxy.

What is claimed is:

1. A magnetic head for reading or writing information magnetically encoded on a substrate which is moved relative to the magnetic head such that the substrate rubs against the magnetic head, comprising:
   a magnetic core;
   a plurality of pole tips conductively connected to said magnetic core;
   a wire coil wrapped around said magnetic core;
   an electrically conductive housing enclosing said magnetic core, said housing being connected to ground and being electrically isolated from said magnetic core;
   a conductive boron carbide contact surface on the magnetic core and in contact with said electrically conductive housing and adjacent to the pole tips against which the substrate rubs against as the substrate is moved relative to the magnetic head,; and
   means for electrically grounding said contact surface to said housing and to ground and means for electrically isolating said contact surface from said magnetic core.

2. The magnetic head as claimed in claim 1 wherein:
   the boron carbide contact surface comprises a pad which is attached to the magnetic core.

3. A magnetic head for reading or writing information magnetically encoded on a substrate which is moved relative to the head such that the substrate rubs against the magnetic head comprising:
   a magnetic core;
   an electrically conductive housing enclosing the magnetic core, said housing being connected to ground and electrically isolated from said magnetic core; and
   a boron carbide contact surface pad on said magnetic core in the area of the magnetic head which contacts the substrate as the substrate is moved relative to the magnetic head;
   said boron carbide contact surface pad being electrically connected to the electrically conductive housing and electrically isolated from said magnetic core.

* * * * *